US006316892B1

(12) United States Patent
Valencia

(10) Patent No.: US 6,316,892 B1
(45) Date of Patent: Nov. 13, 2001

(54) AUTOMATIC DOOR CONTROL SYSTEM

(75) Inventor: Gilbert Valencia, Hoffman Estates, IL (US)

(73) Assignee: NT Dor-O-Matic, Inc., Harwood Heights, IL (US)

( * ) Notice: Subject to any disclaimer, the term of this patent is extended or adjusted under 35 U.S.C. 154(b) by 0 days.

(21) Appl. No.: 09/321,640

(22) Filed: May 28, 1999

(51) Int. Cl.[7] .......... H02P 7/00
(52) U.S. Cl. .......... 318/293; 388/907.2
(58) Field of Search .......... 388/907.2; 318/293, 318/294

(56) References Cited

U.S. PATENT DOCUMENTS 4,454,454 * 6/1984 Valentine .......... 318/293
4,563,625 1/1986 Kornbrekke et al. .
4,952,080 8/1990 Boiucaner et al. .
4,999,551 3/1991 Yoshida et al. .
5,218,282 6/1993 Duhame .
5,625,266 4/1997 Stark .

* cited by examiner

*Primary Examiner*—Khanh Dang
(74) *Attorney, Agent, or Firm*—Michael Best & Friedrich LLP

(57) ABSTRACT

An automatic door control system which uses microcontrollers to control four drive transistors and a drive motor connected in an H-bridge circuit. The microcontrollers use pulse width modulation to control the speed of the drive motor.

10 Claims, 4 Drawing Sheets

| | Latch | | Backcheck |
|---|---|---|---|
| Opening | Q8 on, Q13 pulses, ramp up to opening voltage 12.5 - 28 VDC | | |
| Dynamic braking | 1) Just before reaching backcheck region, ramp down to backcheck voltage, Q8 on, Q13 pulsing, backcheck voltage 9.85 VDC - 16.8 VDC | | 2) at beginning of backcheck region, momentarily remove power Q8, Q13 off<br>3) short motor Q12, Q13 on |
| Backcheck | | | Q8 on, Q13 pulsing at backcheck voltage |
| Hold Open | | | Q8 on, Q13 pulsing, hold open voltage 9.74 VDC |
| Closing | | Q8, Q11, Q12, & Q13 off, KR1 de-energizes applying closing speed circuit across motor for dynamic braking | |
| Latching | Short motor Q12, Q13 on | | |

*FIG. 3*

| | Latch | | Backcheck |
|---|---|---|---|
| Opening | Q8 on, Q13 pulses, ramp up to opening voltage 2V - 24 V | | |
| Dynamic braking | 1) Just before reaching backcheck region, ramp down to backcheck voltage, Q8 on, Q13 pulsing, backcheck voltage 2 VDC - 8 VDC | | 2) at beginning of backcheck region, momentarily remove power Q8, Q13 off<br>3) short motor Q12, Q13 on |
| Backcheck | | | Q8 on, Q13 pulsing at backcheck voltage |
| Closing | | Q11 on, Q12 pulsing, ramp up to closing voltage, 2 VDC - 21 VDC | |
| Dynamic braking | 2) at beginning of latch region, momentarily remove power, Q11, Q12 off<br>3) short motor, Q12, Q13 on | 1) Just before reaching latch position, ramp down to latch voltage, 2 VDC - 8 VDC Q11 on, Q12 pulsing | |
| Latching | Q11 on, Q12 pulsing at latch voltage | | |

*FIG. 4*

AUTOMATIC DOOR CONTROL SYSTEM

BACKGROUND OF THE INVENTION

This invention relates generally to automatic door control systems for moveable doors and more particularly to the use of pulse width modulation for controlling the door motor.

Typical automatic door control systems require a means for sensing the position of the door. This position sensing is used for controlling the various stages of operation of the door and for monitoring the door for abnormal operation, such as an obstructed door. Position monitoring devices are used such as limit switches, which are useful for monitoring specific positions of the door, but do not monitor for non-movement indicating that the door is obstructed.

Some prior art automatic door control systems use multitap autotransformers (with multiple fixed speeds) for motor speed control. This can cause the door to jerk when changing speeds.

The foregoing illustrates limitations known to exist in present automatic door control systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a automatic door control system for use with a moveable door system wherein at least one door is moved between closed and opened positions by means of the rotary drive of an electric motor, the automatic door control system comprising: a bi-directional multi-speed rotary drive motor operably connected to the at least one door; motor drive controller including: a microcontroller having a pulse width modulation capability; and four transistors in an H-Bridge configuration.

The foregoing and other aspects will become apparent from the following detailed description of the invention when considered in conjunction with the accompanying drawing figures.

BRIEF DESCRIPTION OF THE DRAWING FIGS.

FIG. 3 is diagram illustrating the operation of the automatic door control system shown in FIG. 1; and FIG. 4 is a diagram illustrating the operation of the automatic door control system shown in FIG. 2.

DETAILED DESCRIPTION

Figure 1:
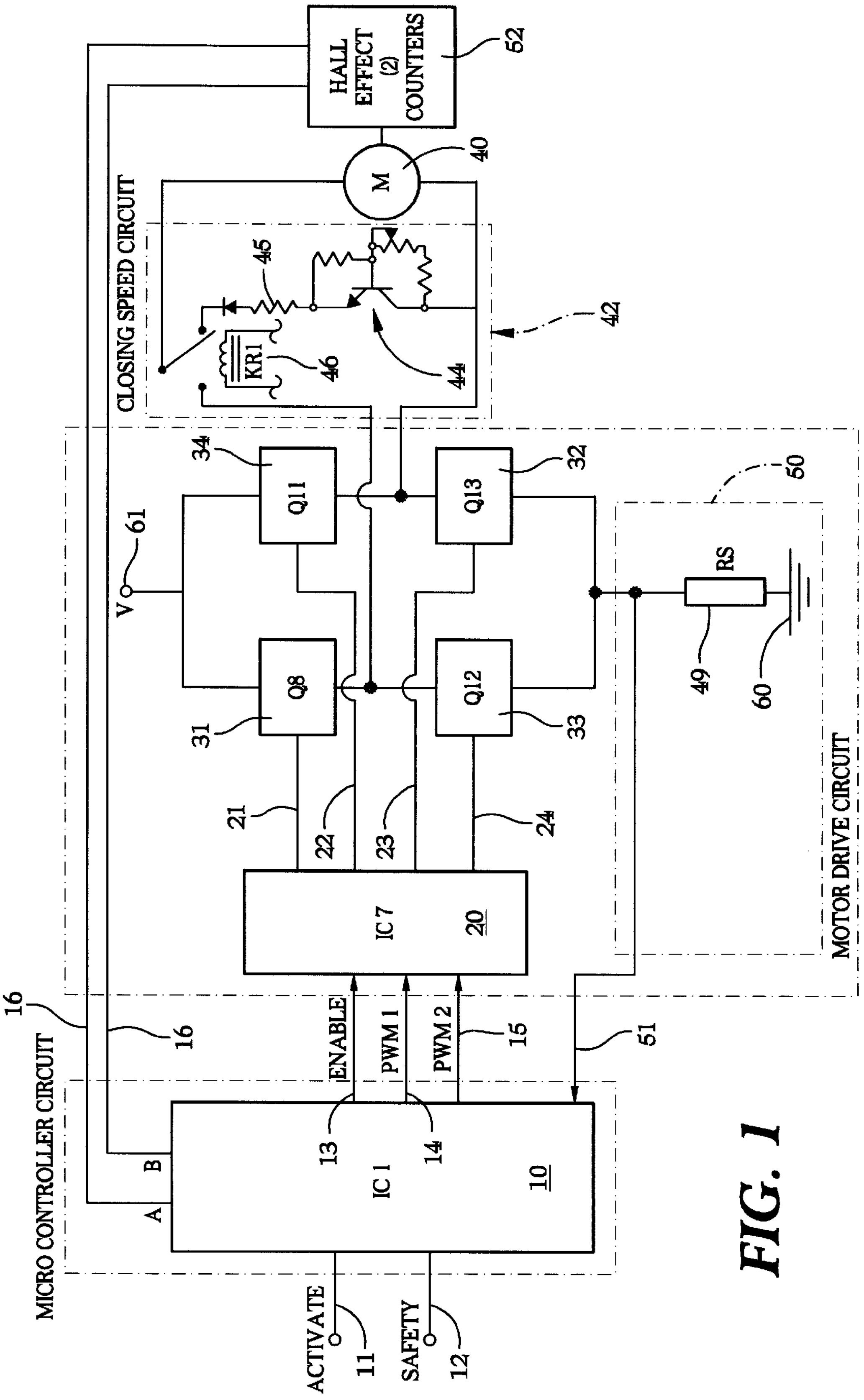
FIG. 1 is a schematic diagram of a first embodiment of an automatic door control system, preferably for use with swinging doors.
Figure 2:
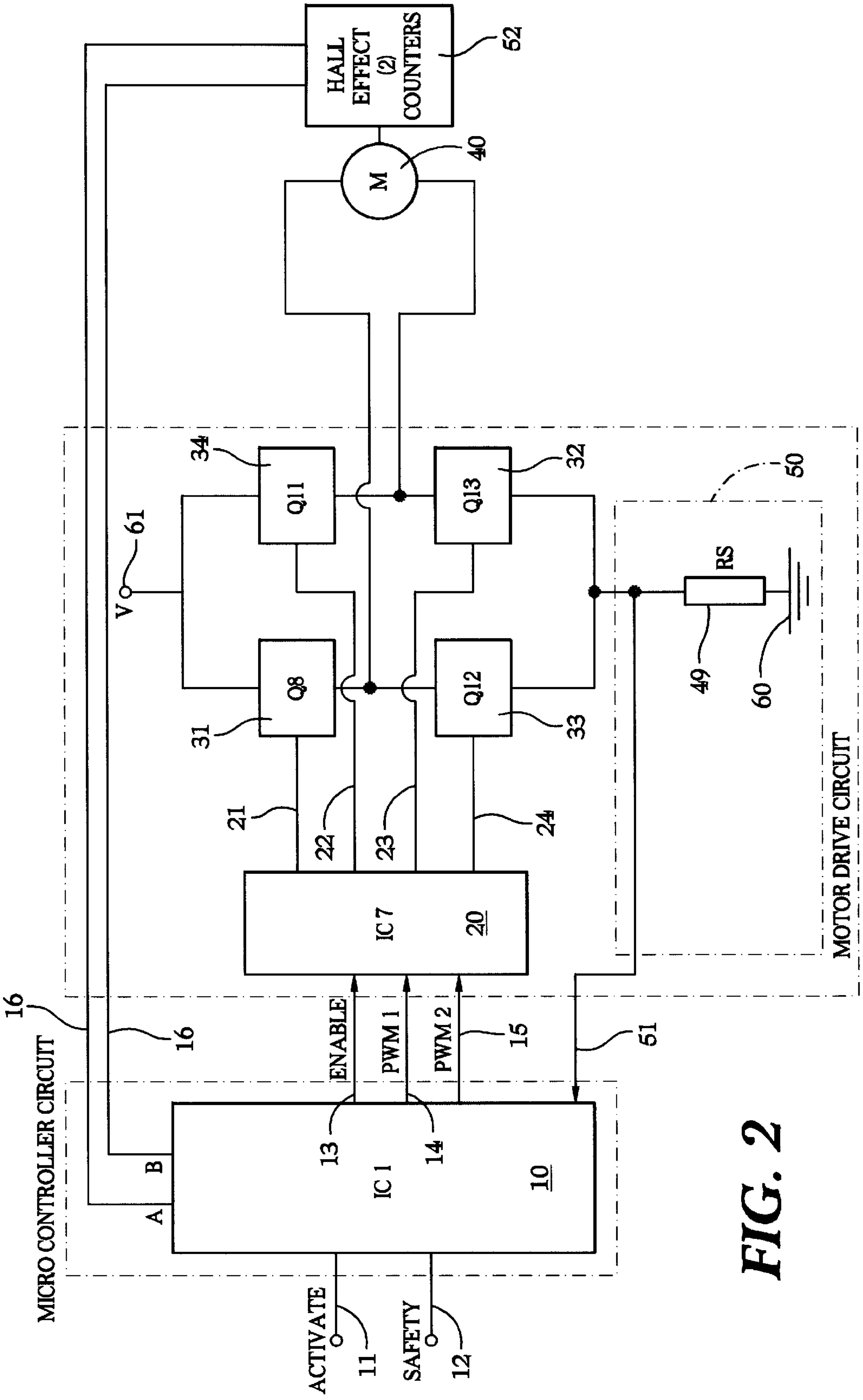
FIG. 2 is a schematic diagram of a second embodiment of an automatic door control system, preferably for use with sliding doors.

The automatic door control system of the present invention can be used for many types of moveable automatic doors. The control system shown in FIG. 1 is, preferably, used for swinging doors which use a door closer spring for closing the door. The control system shown in FIG. 2 is, preferably, used for sliding doors that are motor driven both open and closed. This sliding door control system can also be used for other types of doors that are powered both open and closed, such as accordion fold doors. A feature of this invention is the use of four transistors and the motor in an H-bridge configuration. This configuration allows the drive transistors to be used to dynamically brake the motor. Prior art door control systems have used dynamic brake circuits which are separate from the drive circuit. Another feature of this invention is the switchable closing speed circuit which switches between connecting the drive circuit to the motor to connecting the closing speed circuit to the motor. This closing speed circuit can be used with prior art types of drive circuits.

The automatic door control system shown in the FIGURES uses a master microcontroller 10 that includes five inputs 11, 12, 16 and 51. Input 11 is an ACTIVATE signal, typically generated by a motion sensor, push button or other common types of sensors, to signal the automatic door control system to open the door. Input 12 is a SAFETY signal, typically generated by sensors similar to those used to generate the ACTIVATE signal, but used to indicate a potentially unsafe condition, such as a person in the doorway. Inputs 16 are motor rotation signals generated by motor encoder 52 to indicate the rotation of the motor, the direction of rotation of the motor and the rate of rotation of the motor. Preferably, the encoder uses two Hall effect sensors and a magnetic disc mounted on an end of the motor shaft. These signals can be used as a speed feedback signal, to monitor proper rotation of the motor, etc. The fifth input signal is a motor current signal 51, which is used to monitor for a stall condition of the motor 40 caused by the door reaching the limits of its travel, the door being obstructed or other improper operation. The master controller 10 also includes three outputs. The first output 13, ENABLE, is a control signal to a motor drive controller 20. The second and third outputs 13, 14 are pulse width modulation control signals for the driver controller 20.

The main part of the automatic door control system is a motor drive circuit that includes the drive controller 20 and four drive transistors 31, 32, 33, 34 configured as an H-bridge circuit. An H-bridge circuit is a control circuit where four transistors and a load (motor 40) are arranged in the form of the letter H with the load being connected to the middle of the H. When used for DC motor control, it can control both speed and direction of the motor. It can also provide dynamic braking of the motor. Preferably, the transistors 31, 32, 33, 34 are field effect transistors, but N channel, P channel Mosfet, bipolar or IGBT transistors can be used.

In FIG. 2, the motor drive circuit is connected directly to the motor 40. In FIG. 1, the motor drive circuit is connected to a closing speed circuit 42, which is selectively connected to the motor 40 by relay 46 (which is controlled by master controller 10). Closing speed circuit 42 is configured such that when relay 46 is energized, the motor drive circuit (drive controller 20 and transistors 31, 32, 33, 34) are connected to motor 40. When relay 46 is de-energized, the closing speed circuit 42 is connected to the motor 40 and the motor drive circuit is disconnected from motor 40. Preferably, closing speed circuit 42 includes a fixed resistance 45 and a variable resistance 44, which allows the loading of the motor 40, when the closing speed circuit is connected, to be adjusted. The automatic door control system shown in FIG. 1 is typically used with doors that use a spring to provide a closing force, such as swinging doors. The closing speed circuit 42 provides a load across the motor 40, which rotates as a result of the door being closed. This load limits the speed of the motor 40 and, therefore, the speed of the door.

A motor current sensing circuit 50 is provided to sense motor overcurrent conditions. This circuit 50 includes a resistor 49 between one side of the motor 40 and ground 60. The current signal 51 is an analog signal, voltage, which is proportional to the current through the motor 40.

A motor drive input voltage 61 is provided to the inputs of transistors 31, 34. The outputs of transistors 31, 34 are connected to the inputs of transistors 33, 32, respectively. The connection between transistors 31, 33 is connected to one side of motor 40 and the connection between transistors 34, 32 is connected to the other side of motor 40. The outputs of transistors 33, 32 are connected via resistor 49 to ground 60. Control signals 21, 22, 23 and 24 control, i.e., turn on and off and pulse transistors 31, 32, 33, 34. The various states of the transistors 31, 32, 33, 34 and the closing speed circuit 42 are shown in FIGS. 3 and 4.

To operate a swinging door (see FIGS. 1 and 3), an ACTIVATE signal 11 is generated and causes master controller 10 to begin a door opening sequence by generating an ENABLE signal 13. The ENABLE signal 13 contains control signals for drive controller 20. The PWM 1 signal 14 contains the appropriate pulse width modulation information for drive controller 20 for normal opening and closing. The PWM 2 signal 15 contains the appropriate pulse width modulation information for a Power Boost mode explained below. Initially, transistor 31 is turned on continuously and transistor 32 is pulsed. The rate of pulsation of transistor 32 is ramped up until the effective DC voltage applied to motor 40 is at the opening voltage. The opening voltage is adjustable between 12.5 and 28 VDC depending upon the size of the door, etc. Just before the door reaches a backcheck region (typically 75° or about 80% open), dynamic braking is applied by 1) ramping the pulsing of transistor 32 down to a backcheck voltage, 9.85 to 16.8 VDC, 2) at the beginning of the backcheck region, momentarily removing power to motor 40 by turning off transistors 31, 32 and 3) momentarily (16 ms) shorting the motor by turning transistors 32, 33 on. For the remainder of the backcheck region, the backcheck voltage is applied by turning on transistor 31 and pulsing transistor 32 at the backcheck voltage rate. When the door is fully open, sensed by the motor stall current through current sensing circuit 50, the door is held open by applying power to the motor by turning on transistor 31 and pulsing transistor 32 at a door hold open rate or 9.74 VDC.

After a predetermined time, and if the SAFETY input 12 indicates a safe to close condition, the master controller 10 begins a door closing sequence. All transistors 31, 32, 33, 34 are turned off and relay 46 is de-energized connecting the closing speed circuit 42 to the motor 40. A closing spring in the door operator provides the closing force to the door and the closing speed circuit loads the motor 40 to control the closing speed. When the door reaches the closed position, transistors 33, 32 are turned on shorting the motor and providing some resistance to inadvertent door movement such a caused by wind.

For doors which use a spring to close the door, an optional power boost mode is available. The purpose to provide additional closing power using motor 40 in the event of stall condition of the door while closing, such as closing against a high wind. If power boost is on and the door stops moving, relay 46 energizes, disconnecting the closing speed circuit 42 from the motor 40 and connecting the motor drive circuit to the motor 40. Drive controller 20 turns on transistor 34 and pulses transistor 33 at a low rate to provide a motor boost to the door. The PWM 2 output signal 15 contains the pulse width modulation information for drive controller 20.

When the power boost option is turned on and the door is closed, transistor 34 is turned on and transistor 33 is pulsed at a low rate to hold the door closed, rather than shorting the motor via transistors 32, 33.

To operate a sliding door (see FIGS. 2 and 4), an ACTIVATE signal 11 is generated and causes master controller to begin a door opening sequence. Initially, transistor 31 is turned on continuously and transistor 32 is pulsed. The rate of pulsation of transistor 32 is ramped up until the effective DC voltage applied to motor 40 is at the opening voltage. The opening voltage is adjustable between 2 and 24 VDC depending upon the size of the door, etc. Just before the door reaches a backcheck region (typically 75° or about 80% open), dynamic braking is applied by 1) ramping the pulsing of transistor 32 down to a backcheck voltage, 2 to 8 VDC, 2) at the beginning of the backcheck region, momentarily removing power to motor 40 by turning off transistors 31, 32 and 3) momentarily shorting the motor by turning transistors 32, 33 on. For the remainder of the backcheck region, the backcheck voltage is applied by turning on transistor 31 and pulsing transistor 32 at the backcheck voltage rate. When the door is fully open, sensed by the motor stall current through current sensing circuit 50, all transistors are turned off.

After a predetermined time, and if the SAFETY input 12 indicates a safe to close condition, the master controller 10 begins a door closing sequence. Transistor 34 is turned on and transistor 33 is pulsed at a closing rate, 2 to 21 VDC. Just before the door reaches a latch region (typically 15° or about 20% open), dynamic braking is applied by 1) ramping the pulsing of transistor 33 down to a latch voltage, 2 to 8 VDC, 2) at the beginning of the latch region, momentarily removing power to motor 40 by turning off transistors 34, 33 and 3) momentarily shorting the motor by turning transistors 32, 33 on. For the remainder of the latch region, the latch voltage is applied by turning on transistor 34 and pulsing transistor 33 at the latch voltage rate. When the door is fully closed, sensed by the motor stall current through current sensing circuit 50, all transistors are turned off.

For swing doors which use the motor 40 as the closing force, rather than a spring, the automatic door control system shown in FIGS. 2 and 4 can used. The opening and closing sequence is basically the same. However the pulse rates or effective voltages applied would be different. In addition, since a swing door could be opened to the exterior of a building, it may be necessary to provide a hold open mode as shown in FIG. 3.

Having described the invention, what is claimed is:

1. An automatic door control system for use with a moveable door system wherein at least one door is moved between closed and opened positions by means of the rotary drive of an electric motor, the automatic door control system comprising:

a bi-directional multi-speed rotary drive motor coupled to the at least one door;

a microcontroller coupled to the motor, the microcontroller having a pulse width modulation capability;

a motor drive circuit coupled to the microcontroller, the motor drive circuit including a drive controller and four transistors in an H-bridge configuration, the drive controller selectively turning on, off, and pulsing the four transistors in response to the microcontroller to dynamically brake the motor; and an encoder mounted on the motor for sensing the rotation of the motor.

2. The automatic door control system according to claim 1, wherein the encoder comprises a magnetic disc rotor connected to a rotating component of the motor and a plurality of magnetic sensors.

3. The automatic door control system according to claim 2, wherein the magnetic sensors are Hall effect sensors.

4. An automatic door control system for use with a moveable door system wherein at least one door is moved between closed and opened positions by means of the rotary drive of an electric motor, the automatic door control system comprising:

a bi-directional multi-speed rotary drive motor coupled to the at least one door;

a microcontroller coupled to the motor, the microcontroller having a pulse width modulation capability;

a motor drive circuit coupled to the microcontroller, the motor drive circuit including a drive controller and four transistors in an H-bridge configuration, the drive controller selectively turning on, off, and pulsing the four transistors in response to the microcontroller to dynamically brake the motor;

a closing speed control circuit;

a switch for selectively connecting the closing speed control circuit to the motor;

a non-adjustable resistor for loading the motor to a predetermined load when the closing speed control circuit is connected to the motor; and an adjustable resistor in series with the non-adjustable resistor.

5. An automatic door control system for use with a moveable door system wherein at least one door is moved between closed and opened positions by means of the rotary drive of an electric motor, the automatic door control system comprising:

a bi-directional multi-speed rotary drive motor coupled to the at least one door;

a microcontroller coupled to the motor, the microcontroller having a pulse width modulation capability;

a motor drive circuit coupled to the microcontroller, the motor drive circuit including a drive controller and four transistors in an H-bridge configuration, the drive controller selectively turning on, off, and pulsing the four transistors in response to the microcontroller to dynamically brake the motor; and a current sensing circuit connected to the motor.

6. An automatic door control system for use with a moveable door system wherein at least one door is moved between closed and opened positions by means of the rotary drive of an electric motor, the automatic door control system comprising:

a bi-directional multi-speed rotary drive motor coupled to the at least one door;

a master controller coupled to the motor;

a motor drive controller coupled to the master controller;

four transistors in an H-Bridge configuration coupled to the motor drive controller and the motor;

an encoder mounted on the motor and coupled to the master controller for sensing rotation of the motor; and a current sensing circuit connected to the motor and the master controller, the master controller generating control signals responsive to the encoder and the current sensing circuit for controlling the motor drive controller, the motor drive controller selectively turning on, off and pulsing the transistors in response to master controller to dynamically brake the motor.

7. The automatic door control system according to claim 6, further comprising:

a closing speed control circuit; and a switch for selectively connecting the closing speed control circuit to the motor, the switch being responsive to a control signal from the master controller.

8. A method for automatically controlling the operation of a moveable door system wherein at least one door is moved between closed and opened positions by means of the rotary drive of an electric motor, the method comprising the acts of:

a) for opening the at least one door;

turning on a first drive transistor;

pulsing a second drive transistor at an opening rate;

prior to reaching a backcheck position, ramping down the rate of pulsing the second drive transistor to a backcheck rate;

upon reaching the backcheck position, momentarily turning off the first drive transistor and the second drive transistor;

momentarily turning on the second drive transistor and a third drive transistor;

turning on the first drive transistor and pulsing the second drive transistor at the backcheck rate;

b) for closing the at least one door;

turning on a fourth drive transistor;

pulsing the third drive transistor at a closing rate;

prior to reaching a latch position, ramping down the rate of pulsing the third drive transistor to a latch rate;

upon reaching the latch position, momentarily turning off the third and fourth drive transistors;

momentarily turning on the second and third drive transistors; and turning on the fourth drive transistor and pulsing the third drive transistor at the latch rate.

9. A method for automatically controlling the operation of a moveable door system wherein at least one door is moved between closed and opened positions by means of the rotary drive of an electric motor, the method comprising the acts of:

a) for opening the at least one door;

turning on a first drive transistor;

pulsing a second drive transistor at an opening rate;

prior to reaching a backcheck position, ramping down the rate of pulsing the second drive transistor to a backcheck rate;

upon reaching the backcheck position, momentarily turning off the first drive transistor and the second drive transistor;

momentarily turning on the second drive transistor and a third drive transistor;

turning on the first drive transistor and pulsing the second drive transistor at the backcheck rate;

upon reaching the opened position, turning on the first drive transistor and pulsing the second drive transistor at a hold open rate;

b) for closing the at least one door;

dynamically braking the at least one door by connecting a closing speed control circuit 42 across the motor;

upon reaching the closed position: disconnecting the closing speed control circuit and turning on the second and third drive transistors.

10. A method for automatically controlling the operation of a moveable door system wherein at least one door is moved between closed and opened positions by means of the rotary drive of an electric motor, the method comprising the acts of:

providing a bi-directional multi-speed rotary drive motor coupled to the at least one door;

providing a first, a second, a third, and a fourth drive transistor in an H-bridge configuration coupled to the motor;

turning on the first drive transistor;

pulsing the second drive transistor at an appropriate rate; and dynamically braking the at least one door by momentarily turning on the second drive transistor and the third drive transistor.

* * * * *